Patented Apr. 6, 1943

2,315,834

UNITED STATES PATENT OFFICE 2,315,834

1-AMINOARYL-5-PYRAZOLONE-4-SULPHONIC ACIDS

Paul Zervas, Cologne Mulheim, Germany, assignor to General Aniline & Film Corporation, New York, N. Y., a corporation of Delaware No Drawing. Application August 9, 1941, Serial No. 406,239. In Germany April 6, 1939

5 Claims. (Cl. 260—310)

The present invention relates to 1-aminoaryl-5-pyrazolone-4-sulphonic acids and to a method of preparing the same.

If concentrated sulphuric acids in the presence of acetic anhydride or chlorosulphonic acid are allowed to react with 5-pyrazolones, 5-pyrazolone-4-sulphonic acids are obtained. The sulphonic acid group in these pyrazolones is labile; it can be split off, for instance by means of hydrochloric acid or can be replaced by the nitroso group by the action of sodium nitrite.

It has now been found that the 4-sulphonic acids of 1-nitroaryl- or 1-acylaminoaryl-5-pyrazolones prepared according to this method can be reduced or saponified to 1-aminoaryl-5-pyrazolone-4-sulphonic acids according to the usual methods without a splitting off of the sulphonic acid group. This fact could not be foreseen considering the labile position of the sulphonic acid group. It has proved to be preferable to effect the reduction in a weakly acid or alkaline medium, the saponification in an alkaline medium. The 1-aminoaryl-5-pyrazolone-4-sulphonic acids thus obtainable are of great technical importance as the new compounds are valuable intermediate products, e. g. for the manufacture of azodyestuffs.

The following examples illustrate the invention without, however, limiting it thereto, the parts being by weight.

Example 1

32.1 parts of sodium 1-(4'-nitrophenyl)-3-methyl-5-pyrazolone-4-sulphonate are dissolved in 100 parts of water and reduced at 75–85° C. for about 1 hour with 70 parts of iron filings which are etched with some ccs. of glacial acetic acid. The reduction mixture is rendered alkaline with excess caustic soda lye, boiled for a short while and filtered with suction. The clear solution of the amino compound is neutralized with hydrochloric acid and evaporated. The 1-(4'-aminophenyl)-3-methyl-5-pyrazolone-4-sulphonic acid separates as yellowish white crystals with good yield.

Example 2

32.1 parts of sodium 1-(3'-nitrophenyl)-3-methyl-5-pyrazolone-4-sulphonate are dissolved in 50 parts of water and a concentrated solution of 70 parts of sodium carbonate is added. Then a concentrated solution of 170 parts of ferrous sulphate is allowed to run into this solution at a temperature of 50–60° C. When the reduction is complete the precipitate of ferric hydroxide is removed by filtration. The amino compound can be separated from the filtrate as a white precipitate by acidifying with hydrochloric acid.

Example 3

33.3 parts of sodium 1-(4'-acetaminophenyl)-3-methyl-5 - pyrazolone - 4 - sulphonate are dissolved in 150 parts of 10 per cent caustic soda lye and saponified by heating for about 1 hour. The isolation of the 1-(4'-aminophenyl)-3-methyl-5-pyrazolone-4-sulphonic acid is effected by neutralizing and evaporating as stated in Example 1.

I claim:

1. Process of preparing 1-aminophenyl-5-pyrazolone-4-sulphonic acids which comprises treating 1-nitrophenyl-5-pyrazolone-4-sulphonic acid with reducing agents for nitro groups.

2. Process of preparing 1-aminophenyl-5-pyrazolone-4-sulphonic acids which comprises treating a 1-nitrophenyl-5-pyrazolone-4-sulphonic acid with a reducing agent for nitro groups in a weakly acid to alkaline medium.

3. As new products 1-aminophenyl-5-pyrazolone-4-sulphonic acids.

4. As new product 1 - (4' - aminophenyl)-3-methyl-5-pyrazolone-4-sulphonic acid.

5. As new product 1 - (3' - aminophenyl)-3-methyl-5-pyrazolone-4-sulphonic acid.

PAUL ZERVAS.